United States Patent [19]

Schmidt

[11] 4,347,815

[45] Sep. 7, 1982

[54] AIR-COMPRESSING INTERNAL COMBUSTION ENGINE WITH A PRECOMBUSTION CHAMBER

[75] Inventor: Hans-Georg Schmidt, Nürtingen-Hardt, Fed. Rep. of Germany

[73] Assignee: Daimler-Benz Aktiengesellschaft, Stuttgart, Fed. Rep. of Germany

[21] Appl. No.: 156,815

[22] Filed: Jun. 5, 1980

[30] Foreign Application Priority Data

Jun. 13, 1979 [DE] Fed. Rep. of Germany ....... 2923869

[51] Int. Cl.³ ............................................. F02B 3/00
[52] U.S. Cl. ................................. 123/269; 123/293
[58] Field of Search ............................. 123/269, 293

[56] References Cited

U.S. PATENT DOCUMENTS

| 1,907,095 | 5/1933 | Adams | 123/293 |
| 2,741,229 | 4/1956 | Stump | 123/293 |
| 2,766,738 | 10/1956 | Hoffmann | 123/293 |
| 4,023,541 | 5/1977 | Sakamoto | 123/269 |
| 4,224,902 | 9/1980 | Binder | 123/293 |

FOREIGN PATENT DOCUMENTS

| 891767 | 7/1949 | Fed. Rep. of Germany | 123/269 |
| 1401961 | 11/1968 | Fed. Rep. of Germany | 123/269 |
| 840691 | 5/1939 | France | 123/293 |
| 376236 | 11/1939 | Italy | 123/293 |
| 528903 | 11/1940 | United Kingdom | 123/293 |

*Primary Examiner*—Ronald B. Cox
*Attorney, Agent, or Firm*—Craig and Antonelli

[57] ABSTRACT

An air-compressing internal combustion engine which includes a cylinder block, a plurality of cylinders in the cylinder block, a piston reciprocably mounted in the respective cylinders, and a cylinder head disposed on the cylinder block. A precombustion chamber is arranged in the cylinder head and associated with the respective cylinders and a number of approximately radially extending burner holes are provided around a periphery of an end of the precombustion chamber. A depression is arranged in the head of each of the pistons and stellate depressions emanate from the depression in the cylinder head. Each of the stellate depressions ascend continuously in a radially outward direction and a further substantially axially extending burner hole is provided at the end of the precombustion chamber.

2 Claims, 2 Drawing Figures

AIR-COMPRESSING INTERNAL COMBUSTION ENGINE WITH A PRECOMBUSTION CHAMBER

The present invention relates to an internal combustion engine and, more particularly, to an air-compressing fuel-injected internal combustion engine which includes a precombustion chamber arranged in a cylinder head with an end of the precombustion chamber, provided with approximately radially extending burner holes, extending, at a top dead center position of a piston of the engine into a depression arranged in the piston head, with stellate depressions emanating from the depression arranged in the piston head, which depressions correspond in number and direction to the radially extending burner holes.

In German Pat. No. 891,767, an internal combustion engine is proposed wherein stellate depressions are provided in the piston head, which depressions are adapted, in their cross sectional shape, to the form of the fuel-air mixture jet exiting from the precombustion chamber so that a respectively metered amount of air can be admixed to each fuel-air mixture jet, in such a distribution that each cross sectional portion of the fuel-air mixture jet has available an appropriate amount of air provided by the corresponding cross sectional portion of the associated depression.

A disadvantage of this proposed construction resides in the fact that, the air accumulation for each fuel-air mixture jet is provided remote from the precombustion chamber and only a small amount of air is present in the direct vicinity of the precombustion chamber. Although such proposed arrangement leads to an advantageous fuel consumption and to an increase in power, additional disadvantages arise such as, for example, poor starting characteristics, low compression ratio, explosion-like combustions, and others.

The aim underlying the present invention essentially resides in providing an air-compressiong fuel-injected combustion engine which exhibits higher compression and which enables an improved combustion process so that the power output of the engine is increased, the fuel consumption is lowered, and the emission of deleterious substances is substantially reduced.

In accordance with advantageous features of the present invention, the stellate depressions which emanate from the depression in the piston head are disposed so as to ascend continuously radially outwardly toward the piston head with a further, substantially axially extending burner hole being provided at the end of the precombustion chamber.

By virtue of the above noted features of the present invention, an accumulation of combustion air is produced in a zone of the combustion chamber and, although there is an accumulation of the combustion air, this accumulation is continuously reduced by the continuously ascending stellate depressions so that an entire free volume is kept small and a higher compression is made possible.

Moreover, by virtue of the present invention, an air volume present in a zone of the precombustion chamber is displaced by the burner hole oriented toward the piston head primarily in a direction toward the stellate depressions and thus is conducted into the same direction as the fuel-air mixture jets so that an intensive intermixing as well as a constant replenishment of the oxygen takes place from the zone of the depression. This intermixing progresses radially over an entire surface of the piston head so that an ideal combustion is attained at a higher compression.

Moreover, by virtue of the present invention a blackening rate in the exhaust gas is lower than usual and the proportion of half-combusted hydrocarbons is about 40% below the limit attained in a conventional internal combustion engine with a vortex chamber.

Accordingly, it is an object of the present invention to provide an air-compressing fuel-injected internal combustion engine which avoids, by simple means, shortcomings and disadvantages encountered in the prior art.

Another object of the present invention resides in providing an air-compressing fuel-injected internal combustion engine in which the starting characteristics are improved.

Yet another object of the present invention resides in providing an air-compressing fuel-injected internal combustion engine which has an improved combustion so that the mean pressure and the power of the internal combustion engine are increased.

A further object of the present invention resides in providing an air-compressing fuel-injected internal combustion engine which operates with a substantially lower fuel consumption.

A still further object of the present invention resides in providing an air-compressing internal combustion engine which substantially reduces the emission of hydrocarbons and other deleterious substances in the exhaust gas.

Another object of the present invention resides in providing an air-compressing fuel-injected internal combustion engine which functions realiably in all operating phases of the engine.

These and other objects, features, and advantages of the present invention will become more apparent from the following description when taken in connection with the accompanying drawings which show, for the purposes of illustration only, one embodiment in accordance with the present invention, and wherein.

Figure 1:
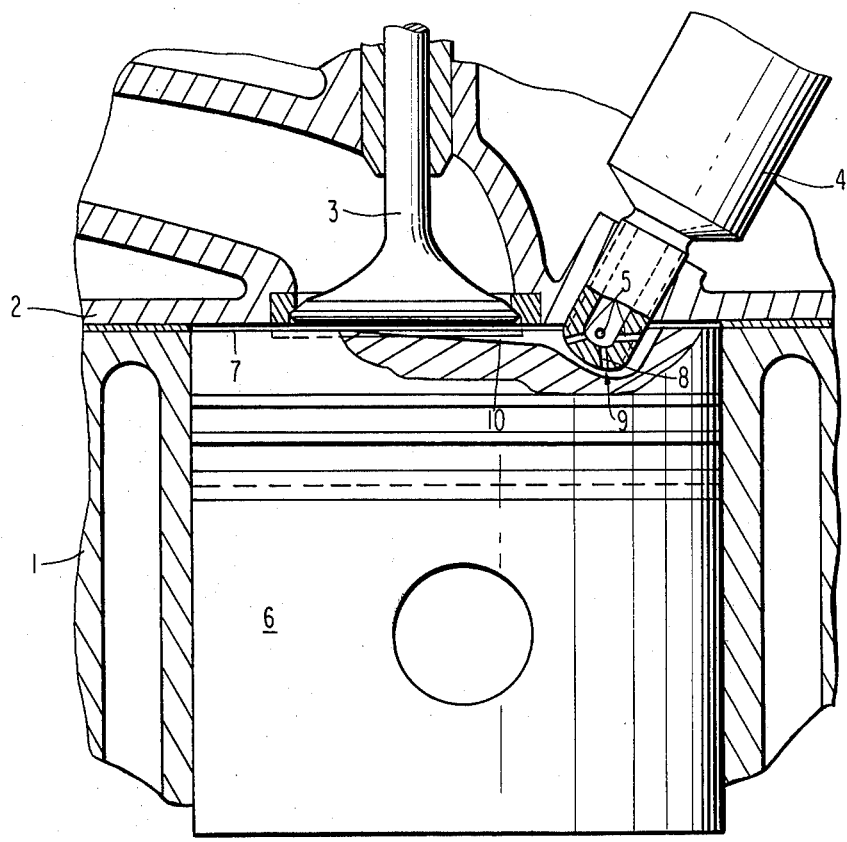
FIG. 1 is a partiall cross sectional view of an internal combustion engine in accordance with the present invention.
Figure 2:
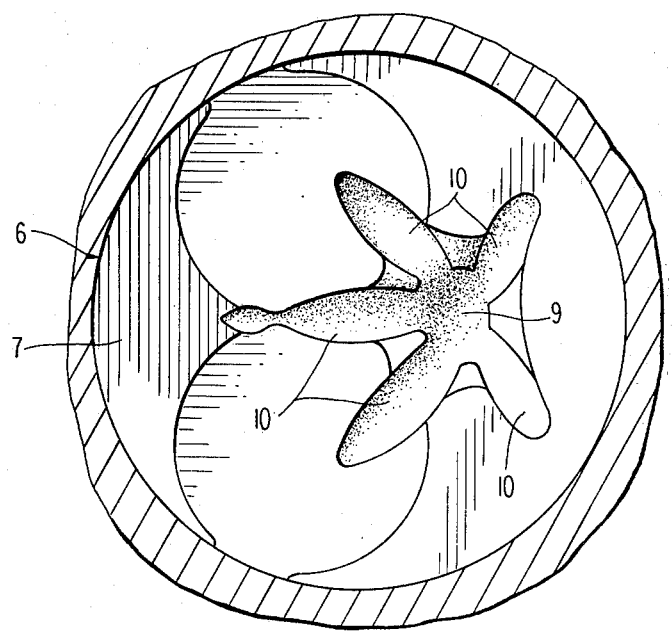
FIG. 2 is a top view of the piston of the internal combustion engine of FIG. 1.

Referring now to the drawings wherein like reference numerals are used in both views to designate like parts and, more particularly, to FIGS. 1 and 2, according to these figures, an internal combustion engine is provided which includes a cylinder block 1 having a cylinder head 2 wherein valves 3 in a precombustion chamber 4 are arranged. The precombustion chamber 4 is provided with a plurality of burner holes 5 arranged about a periphery thereof, with the burner holes 5 extending in a radial direction. The burner holes 5 lie substantially in a plane of a piston head 7 in a top dead center position of the piston 6. A further burner hole 8 is provided at the end of the precombustion chamber 4 with the burner hole 8 being arranged so as to extend substantially axially toward the piston head 7 of the piston 6. A depression generally designated by the reference numeral 9 is provided in the piston head 7 and, at top dead center position of the piston 6, the end of the precombustion chamber 4 enters the depression 9 with a gap remaining between the end of the precombustion chamber 4 and the surface of the depression 9.

Stellate depressions 10 emanate from the depression 9 in the piston head 7, with the stellate depressions 10 being respectively associated with the burner holes 5. The depressions 10 each ascend continuously radially outwardly toward the piston head. In this connection, the respective stellate depressions 10 are configured so that they are rounded in cross section and, preferably, in a lenticular form, and also so that they have a depth which is lower than their width.

Due to the provision of a depression in each of the piston heads 7 of the respective piston 6, an accumulation of a free volume is produced in a zone of the end of the precombustion chamber 4 in a top dead center position of the piston 6. However, the proportion of combustion air collected in the depression 9 is urged into the stellate depressions 10 by the fuel-air mixture jets exiting from the burner hole 8. In the stellate depression 10, an intensive intermixing occurs with a proportion of the combustion air present therein and with the fuel-air mixture jets exiting in the same direction from the burner holes 5.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. An air-compressing fuel-injected internal combustion engine comprising a cylinder block, a plurality of cylinders in the cylinder block, a piston reciprocably mounted in the respective cylinders, a cylinder head disposed on said cylinder block, a precombustion chamber arranged in the cylinder head and associated with the respective cylinders, a plurality of approximately radially extending burner holes provided around a periphery of an end of the precombustion chamber, a depression arranged in a head of each of the pistons, the end of the precombustion chamber extending into the depression when an associated piston is in a top dead center position thereof, and stellate depressions emanating from the depression in the cylinder head and corresponding in number and direction to the plurality of radially extending burner holes and being adapted in their cross-sectional shape to the form of the fuel-air mixture jets exiting from said burner holes, each of the stellate depressions ascending continuously in a radially outward direction for reducing the free volume between the piston and the cylinder head in the top dead center position, and a further substantially axially extending burner hole being provided at the end of the precombustion chamber and oriented into the depression of the piston head, characterized in that the stellate depressions each have a lenticular configuration.

2. An air-compressing fuel-injected internal combustion engine comprising a cylinder block, a plurality of cylinders in the cylinder block, a piston reciprocably mounted in the respective cylinders, a cylinder head disposed on said cylinder block, a precombustion chamber arranged in the cylinder head and associated with the respective cylinders, a plurality of approximately radially extending burner holes provided around a periphery of an end of the precombustion chamber, a depression arranged in a head of each of the pistons, the end of the precombustion chamber extending into the depression when an associated piston is in a top dead center position thereof, and stellate depressions emanating linearly from the depression in the cylinder head and corresponding in number and direction to the plurality of radially extending burner holes and being adapted in their cross-sectional shape to the form of the fuel-air mixture jets exiting from said burner holes, each of the stellate depressions ascending continuously in a radially outward direction for reducing the free volume between the piston and the cylinder head in the top dead center position, and a further substantially axially extending burner hole being provided at the end of the precombustion chamber and oriented into the depression of the piston head, the plurality of radially extending burner holes lie substantially in a plane of the piston head when the piston is in a top dead center position, and characterized in that the stellate depressions each have a lenticular configuration.

* * * * *